(12) United States Patent
Ren

(10) Patent No.: US 8,327,515 B2
(45) Date of Patent: Dec. 11, 2012

(54) MOVING-POSITIONING MEANS OF BELT-FASTENING APPARATUS

(75) Inventor: Yingguang Ren, Shanghai (CN)

(73) Assignee: Shanghai Goro Conveyor System Components Co., Ltd., Shanghai (CN)

( * ) Notice: Subject to any disclaimer, the term of this patent is extended or adjusted under 35 U.S.C. 154(b) by 494 days.

(21) Appl. No.: 12/523,866

(22) PCT Filed: May 16, 2007

(86) PCT No.: PCT/CN2007/001592
§ 371 (c)(1),
(2), (4) Date: Jul. 20, 2009

(87) PCT Pub. No.: WO2008/101372
PCT Pub. Date: Aug. 28, 2008

(65) Prior Publication Data
US 2010/0018044 A1 Jan. 28, 2010

(30) Foreign Application Priority Data

Feb. 16, 2007 (CN) .......................... 2007 1 0037635

(51) Int. Cl.
| | |
|---|---|
| B23P 11/00 | (2006.01) |
| B23D 1/00 | (2006.01) |
| B21D 53/50 | (2006.01) |
| B21F 45/18 | (2006.01) |
| B29D 5/00 | (2006.01) |
| B25C 7/00 | (2006.01) |

(52) U.S. Cl. ............ 29/243.56; 29/51; 29/408; 227/147
(58) Field of Classification Search ................ 29/243.56
See application file for complete search history.

(56) References Cited

U.S. PATENT DOCUMENTS

| | | | | |
|---|---|---|---|---|
| 2,908,008 | A * | 10/1959 | Potter | 29/243.51 |
| 3,261,085 | A * | 7/1966 | Hobson | 29/243.51 |
| 4,111,080 | A * | 9/1978 | Pray | 29/243.51 |
| 4,317,451 | A * | 3/1982 | Cerwin et al. | 606/220 |
| 4,332,071 | A * | 6/1982 | Takahashi | 29/408 |
| 4,333,217 | A * | 6/1982 | Pray | 29/243.51 |
| 4,344,213 | A * | 8/1982 | Pray | 29/243.5 |
| 4,625,369 | A * | 12/1986 | Musil | 24/33 B |
| 5,157,812 | A * | 10/1992 | Musil | 24/33 P |
| 5,653,372 | A * | 8/1997 | Richardson et al. | 227/155 |
| 6,216,851 | B1 * | 4/2001 | Mitas et al. | 198/844.2 |

* cited by examiner

Primary Examiner — Lee D Wilson
Assistant Examiner — Alvin Grant
(74) Attorney, Agent, or Firm — Global IP Services; Tianhua Gu

(57) ABSTRACT

A moving-positioning means of belt-fastening apparatus including a head and an anvil plate on which a row of fastener holes disposed, a row of positioning grooves are disposed in one side of the anvil plate; said positioning grooves are parallel to said fastener holes and the spaces of the positioning grooves are identical to those of said fastener holes; and a positioning strip disposed on the head is compatible with said positioning grooves. Since the positioning grooves and the fastener holes are separately disposed on the anvil plate, the positioning strip may be inserted into the positioning grooves to be located when the head moves. Therefore the fastener holes are no longer used for the location, and the movement of the head is not restricted to the fastener holes, which means the head may move in the whole area of the frame no matter whether the fasteners are inserted into the fastener holes or not. Thus the belt-fastening apparatus may bind the fasteners in a jumping manner when operating, easily and conveniently, and the binding quality is guaranteed.

3 Claims, 2 Drawing Sheets

MOVING-POSITIONING MEANS OF BELT-FASTENING APPARATUS

CROSS REFERENCE TO THE RELATED PATENT APPLICATION

The present patent application is the national stage of PCT/CN2007/001592 filed on May 16, 2007, which claims the priority of the Chinese patent application No. 200710037635.9 filed on Feb. 16, 2007, which application is incorporated herein by reference.

FIELD OF INVENTION

The present invention relates to a belt-fastening apparatus. More specifically, the invention relates to a moving-positioning means of belt-fastening apparatus.

BACKGROUND OF INVENTION

The belt-fastening apparatus is used for binding the fastener into the joint of the conveyor belt so that the conveyor belts are connected by using these fasteners. The tie-rod belt-fastening apparatus has been widely used for its advantages such as easy operating and high binding efficiency. An automatic moving-positioning tie-rod belt-fastening apparatus disclosed in China Patent CN2783046Y includes a frame, a tool head which may move on the frame, and a binder plate which is disposed on the frame and used for pressing the joint of the conveyor belt. Two handles and a moving-positioning unit are disposed on the tool head. By way of the alternative action of the two handles, the binding process and automatic moving are achieved, thus the efficiency is increased. In order to guide the tool head, an installation board the side edge of which is compatible with the rail of the tool head is fixed on the frame. A row of installation holes are disposed in the middle of the installation board. The fastener is put on the installation board in advance and the staples are inserted into the installation holes. The installation holes are also used for the location when the tool head moves. However, only empty ones can be used for the location. If the fastener has not been bound and the staples are still in installation holes, the installation holes can not be used in the location. Thus, it is a disadvantage that the belt-fastening apparatus can only bind in accordance with the order because it moves in a stepping manner rather than a jumping manner. In such situation, the conveyor belt is prone to deformation and distortion during the binding process, consequently, the binding quality can not be guaranteed.

SUMMARY OF INVENTION

The purpose of the present invention is to provide a moving-positioning means of belt-fastening apparatus. The belt-fastening apparatus can move in a jumping manner during the binding process so as to guarantee the quality and overcome the shortcoming that the belt-fastening apparatus operates inconveniently and only in accordance with the order.

To solve the problem stated above, the present invention provides the technical solution as follows:

A moving-positioning means of belt-fastening apparatus, comprising:

a head;

an anvil plate, on which a row of fastener holes are disposed;

a row of positioning grooves disposed on said anvil plate, said row of positioning grooves is parallel to said row of fastener holes, a space between two adjacent grooves of said row of positioning grooves is equal to a space between two adjacent holes of said row of fastener holes respectively; and a positioning strip disposed on the head, which is compatible with said positioning grooves.

Since the positioning grooves and the fastener holes are separately disposed on the anvil plate, the positioning strip may be inserted into the positioning grooves to be located when the head moves. Therefore the fastener holes are no longer used for the location, and the movement of the head is not restricted to the fastener holes, which means the head may move in the whole area of the frame no matter whether the fasteners are inserted into the fastener holes or not. Thus the belt-fastening apparatus may bind the fasteners in a jumping manner when operating, easily and conveniently, and the binding quality is guaranteed.

As a preferable embodiment, the row of positioning grooves is a rack 12, and the positioning groove is a tooth space 13 of the rack 12. With using the rack as positioning grooves, the structure becomes simple and easy to move the tool head.

As another preferable embodiment, the row of positioning grooves is a row of positioning holes 14, which is disposed on the anvil plate. Although the principle applied to this solution is the same as that applied in the prior art, the belt-fastening apparatus can move in a jumping manner due to the independence of the fastener holes and the positioning holes.

BRIEF DESCRIPTION OF DRAWINGS

The present invention is described herein with reference to the drawings and the embodiments.

DETAILED DESCRIPTION OF EMBODIMENTS

Figure 1:
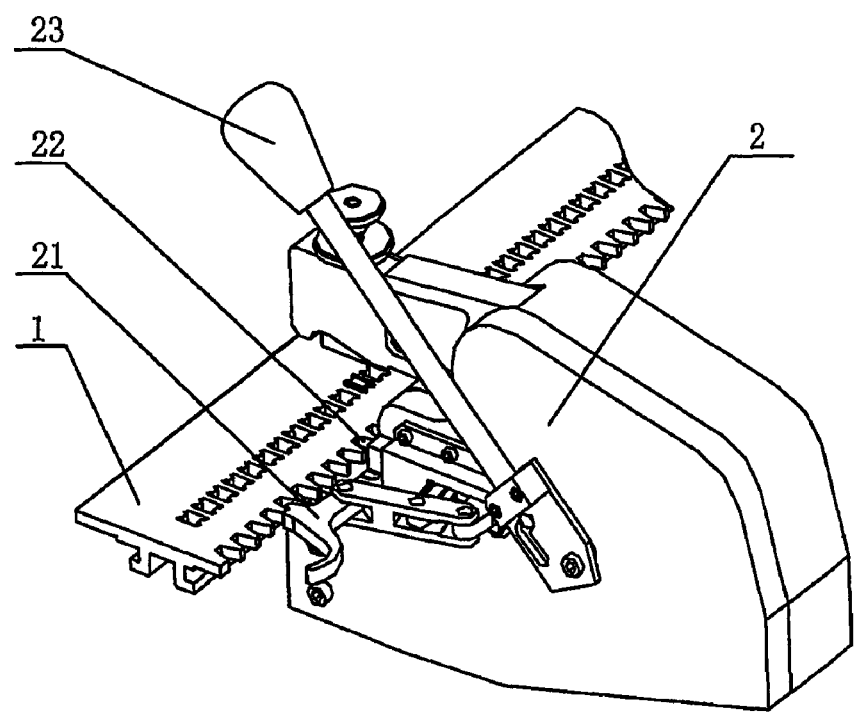
FIG. 1 is a perspective view of an embodiment of the moving-positioning means of belt-fastening apparatus.
Figure 2:
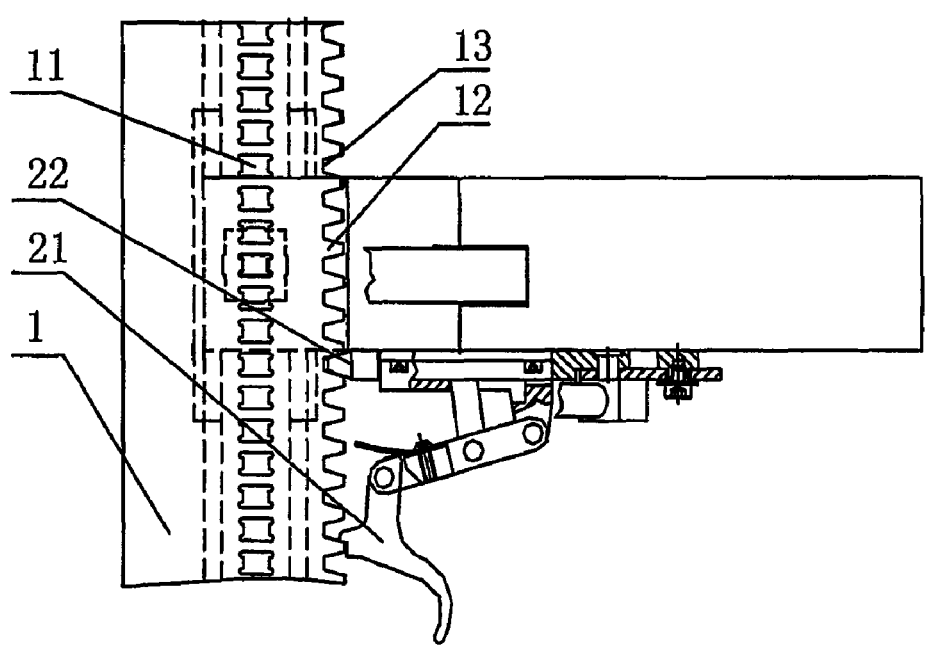
FIG. 2 is a state view of the head located on the anvil plate with a rack.

Referring to the drawings, FIG. 1 and FIG. 2 show an embodiment of the moving-positioning means of belt-fastening apparatus. The moving-positioning means includes an anvil plate 1 which is fixed on the frame, and the head 2 which may move on the frame. A row of fastener holes 11 are disposed on the anvil plate 1. Put the fastener on the anvil plate, and then the staples may be inserted into these fastener holes 11. Thus, the fastener holes 11 should be compatible with the staples in shape and arrangement. A rack 12 is disposed in one side of the anvil plate 1 which opposites the head 2, and parallels to the fastener holes 11. The tooth pitches of the rack 12 are identical to the spaces of the fastener holes 11. A positioning strip 22 is disposed on the head 2 and may be inserted into the tooth space 13 of the rack 12 so that the head 2 may be located relative to the anvil plate 1.

A handle 23 is disposed on the head 2. With using the handle for binding process, the supporting tooth 21, which is also disposed on the head, may move forward along the rack 12, and the head 2 may move to the next position automatically, which largely increases the binding efficiency. The supporting tooth 21 assists in moving and positioning the head. Separate the supporting tooth 21 and the positioning strip 22 from the rack 12, then, move the head 2 to any position on the anvil plate 1 and relocate it to process the binding. The problem in the prior art that the binding is processed only in accordance with the order which means the head moves from one side to the other side is solved consequently.

Figure 3:
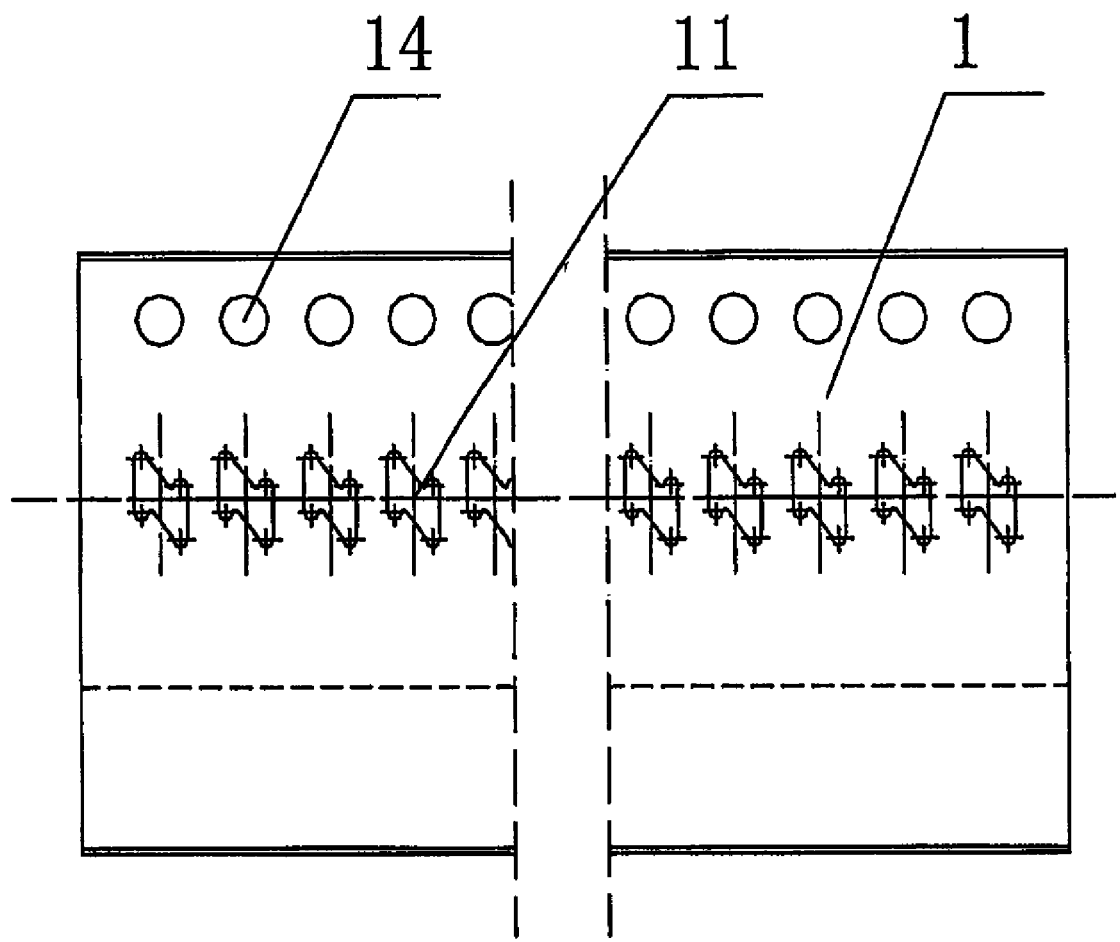
FIG. 3 is an external view of the anvil plate according to another embodiment.

FIG. 3. is an external view of the anvil plate according to another embodiment. A row of positioning holes 14 which parallel to the fastener holes 14 are disposed in one side of the anvil plate 1. The spaces of the positioning holes 14 are identical to those of the fastener holes 11. The positioning means on the head 2 may be positioned through the positioning holes 14. Although the positioning principle is the same as that applied in the prior art, the head may move in a jumping manner because these positioning holes and fastener holes are independent.

It is to be easily understood that the anvil plate in the present invention is not intended to limit the embodiments described herein. If the positioning grooves are separated from the fastener holes, and also parallel to the fastener holes, furthermore, the spaces of the positioning grooves are identical to those of the fastener holes so that the positioning means on the head may not be restricted by the fasteners as located, the purpose of the present invention may be achieved consequently.

What is claimed is:

1. A moving-positioning means of belt-fastening apparatus comprising:
   - an anvil plate, on which a row of fastener holes are disposed;
   - a head, which can be moved to any position where one of the fastener holes is located and be fixed thereon;
   - a row of positioning grooves, which is disposed on said anvil plate, said row of positioning grooves is parallel to said row of fastener holes, a space between two adjacent grooves of said row of positioning grooves is equal to a space between two adjacent holes of said row of fastener holes respectively; and
   - a positioning strip, which is disposed on the head, is compatible with said positioning grooves, thereby when separating the positioning strip from the positioning grooves the head can be moved, when engaging the positioning strip together with the positioning grooves the head is fixed at a position where one of the fastener holes is located.

2. The moving-positioning means of belt-fastening apparatus of claim 1, wherein said row of positioning grooves is a rack, said positioning groove is a space between two adjacent teeth.

3. The moving-positioning means of belt-fastening apparatus of claim 1 wherein said row of positioning grooves is a row of positioning holes, which is disposed on said anvil plate.

* * * * *